Figure 1:
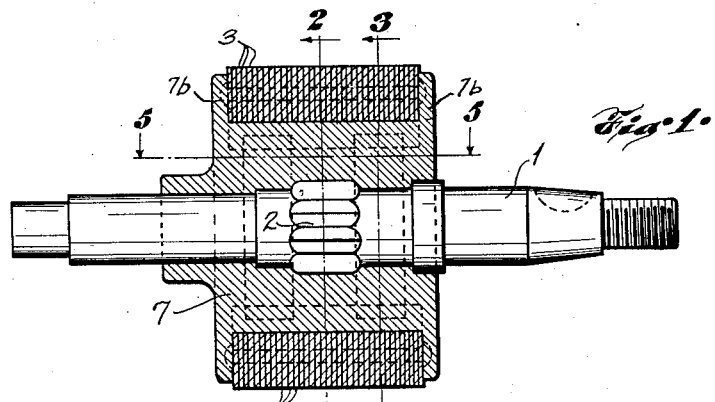

April 4, 1939. C. F. REIS 2,152,918

MAGNETO-ELECTRIC MACHINE

Filed Nov. 20, 1937 2 Sheets-Sheet 1

INVENTOR
CURT F. REIS
By Paul L. Kiehel
ATTORNEY

April 4, 1939. C. F. REIS 2,152,918
MAGNETO-ELECTRIC MACHINE
Filed Nov. 20, 1937 2 Sheets-Sheet 2
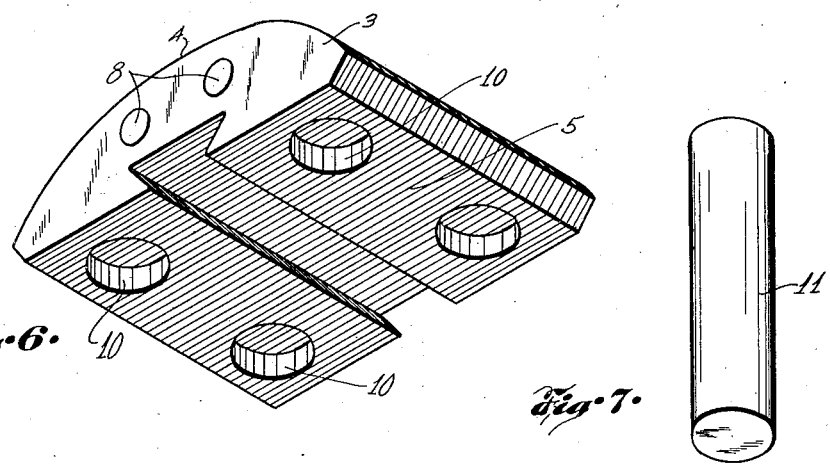
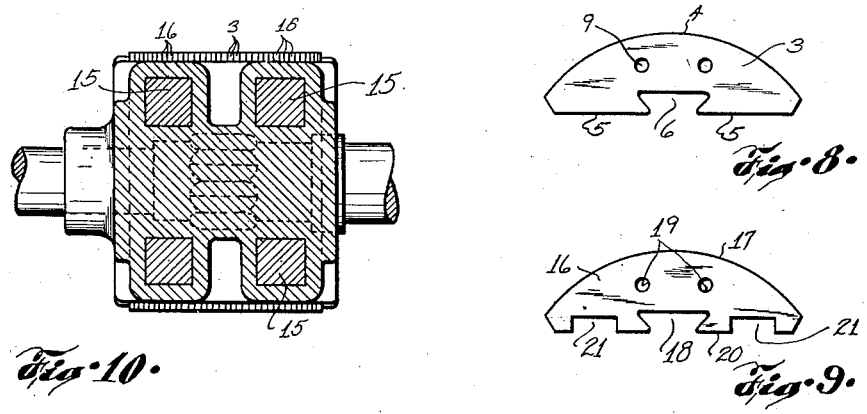
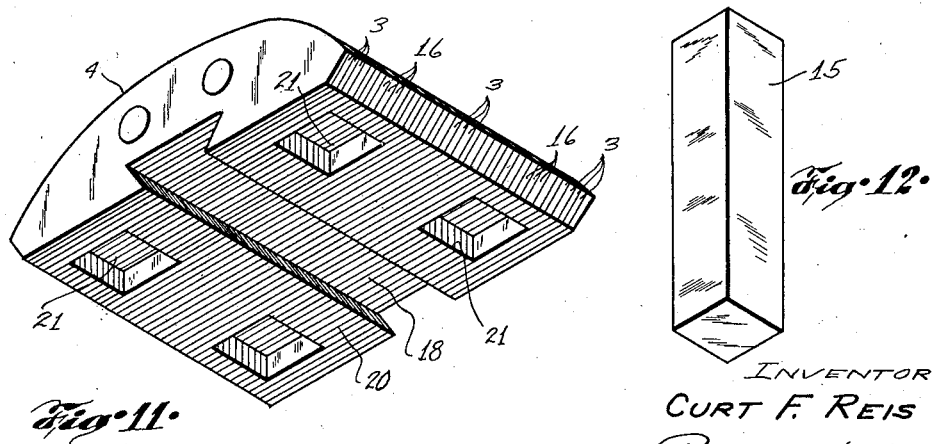
INVENTOR
CURT F. REIS
ATTORNEY Patented Apr. 4, 1939

2,152,918

UNITED STATES PATENT OFFICE 2,152,918

MAGNETO-ELECTRIC MACHINE

Curt F. Reis, Chicago, Ill.

Application November 20, 1937, Serial No. 175,576

3 Claims. (Cl. 171—209)

This invention relates to improvements in magneto electric machines, and more particularly to improvements in rotors of magnetos of rotating field type employing an assembly of permanent magnets, as well as improvements in methods of forming the same.

In certain prevailing types of magneto rotors the permanent bar magnets are arranged in parallelism with the rotor shaft as, for example, is shown in U. S. Letters Patent No. 2,059,745 of November 3, 1936. The quality and character of magnetic materials heretofore known and used for the permanent magnets are largely responsible for such assembly arrangement of the bars, this by reason of the fact that the bars were required to be of substantial length in order to produce the desired coersive force, and consequently were disposed parallel to the shaft so as to minimize the diameter of the rotor. This construction allows the diameter of the rotor to be kept within practical limits, yet requires that the rotor be somewhat longer than is desired and other constructional expedients which add to the cost and detract from the efficiency of the rotor.

Certain lately discovered magnetic alloys, one of which is known and sold under the name of Alnico steel, lend themselves to the production of relatively short bar magnets having great coersive force, the strength and retentivity of the bars produced from these metals being dependent largely upon the cross-sectional area of the bars, rather than upon their length.

An object of the present invention, stated generally, is to provide an improved magneto rotor construction utilizing to the best possible advantage the improved magnetic materials above referred to.

More specifically, an object of the invention is to provide an improved, simplified rotor construction which enables the size of the rotor to be materially reduced, as compared to rotors of comparable capacity made in accordance with former constructions.

Yet another object is attained in the provision of a rotor which is durable, compact, and devoid of threaded elements or the like for maintaining its essential parts in assembled relation, and wherein the parts are bonded together by a body of molded material, cast in place, to form a rigid unitary structure.

An additional object is attained in an improved rotor construction comprising a shaft, permanent bar magnets disposed symmetrically on opposite sides of the shaft and at right angles thereto, pole shoes having the ends of the bar magnets embedded therein and completely surrounded thereby, and a body of molded non-magnetic material, cast in place about the bar magnets and integrally uniting the shaft, magnets and pole shoes.

Figure 2:
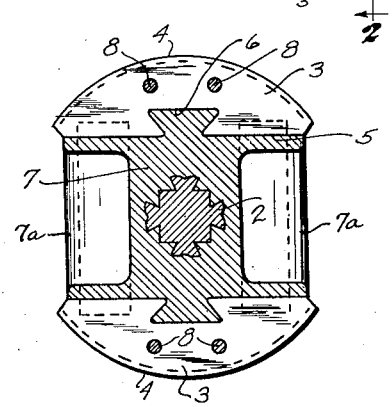
Figure 3:
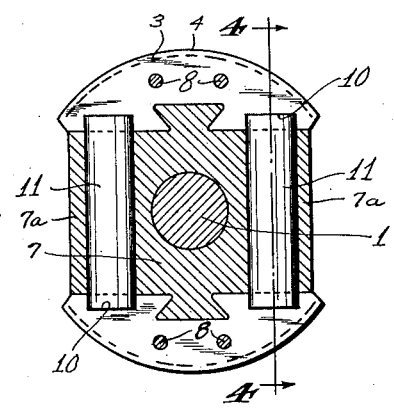
Figure 5:
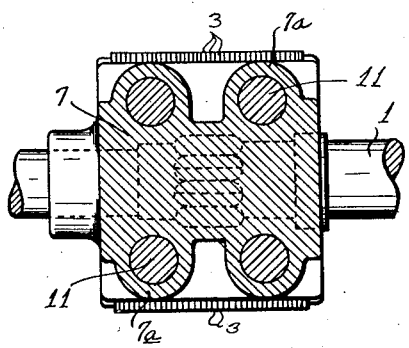
Figure 4:
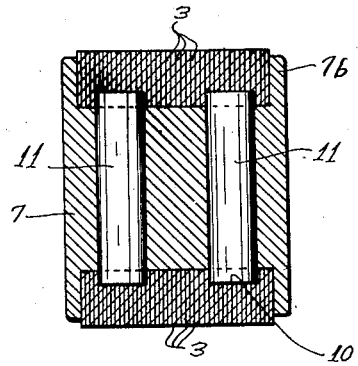

In the drawings, Fig. 1 is a longitudinal sectional view of a rotor embodying the improvements of my invention; Figs. 2 and 3 are transverse sectional views, the sections being taken at lines 2—2 and 3—3, respectively, of Fig. 1; Fig. 4 is a sectional view of the rotor taken on line 4—4 of Fig. 3; Fig. 5 is a longitudinal sectional view taken on the line 5—5 of Fig. 1; Fig. 6 is a perspective view of one of the laminated pole shoes adapted for use with magnet bars of circular section; Fig. 7 is a perspective view of one form of magnet bar; Fig. 8 is a plan view of a pole shoe lamination; Fig. 9 is a plan view of a pole shoe lamination as used for magnet bars of rectangular section; Fig. 10 is a horizontal section of a rotor in which rectangular magnet bars are used; Fig. 11 is a perspective view of a laminated pole shoe adapted for rectangular magnet bars, and Fig. 12 is a perspective view of a magnet bar of rectangular section.

Referring now by characters of reference to the drawings, 1 designates the rotor shaft which is preferably formed of non-magnetic metal, or metal having poor magnetic properties such as high nickel steel. Cast in place about the shaft is a body 7 of non-magnetic material which serves to unite and bond together the primary or essential elements of the rotor into a rigid, integral assemblage. The body material 7 may consist of aluminum or a kindred metal, or of a plastic such as Bakelite, the former having certain preferential characteristics, namely its tendency to shrink upon freezing and thereby to cause the pole shoes to be drawn into tight, pressure engagement with the magnet bars. The shaft 1 is formed with an intermediate section 2 of angulate contour which is embedded in and interlocks with the molded body material. The remaining portions of the shaft may be suitably shaped and dimensioned to meet the requirements of the machine in which it is to be used.

A pair of laminated pole shoes are spaced symmetrically on opposite sides of the rotor shaft, each pole shoe being of substantially segmental configuration, made up of a group of laminae 3, one of which is illustrated in Fig. 8. The pole shoes have cylindrical outer surfaces subtended by planar inner surfaces defined, respectively, by the edges 4 and 5 of the individual laminae. Under-cut or dove-tail recesses 6 are formed in the edges 5 of the laminae, such recesses producing a groove in the inner face of the pole shoe which is adapted to receive in interlocking relation a portion of the body material 7. The laminae are clamped tightly together and secured while in such condition by means of rivets 8 which extend through apertures 9 formed in the laminae.

In the construction of the pole shoes thus described and illustrated in Fig. 6 all of the laminations are initially of the same shape, the circular pockets 10 for receiving the ends of the magnet bars 11 being formed in the pole shoes by a suitable machining operation after the laminations have been assembled and secured together. Thus the pole shoes illustrated in Fig. 6 are adapted to be mounted on the ends of a set of cylindrical magnet bars 11 which extend between and at right angles to the relatively parallel, confronting faces of the pole shoes. In the presently described rotor four magnet bars are employed, the same being arranged in parallelism and defining the four corners of a substantially rectangular, cage-like structure. It will of course be understood that the number of magnet bars may be varied from that shown herein, and may consist of two, or any desired multiple thereof. By referring to Fig. 6 it will be noted that the pockets 10 for the ends of the magnet bars are spaced inwardly from the side margins of the pole shoe so that, in assembly, the ends of the bars will be surrounded by the metal constituting the pole shoe, an arrangement which is much to be preferred since it conduces to the efficiency of the device.

The cage-like structure thus described with the shaft 1 extending centrally therethrough is installed in a suitable matrix (not shown) which supports the parts in the spaced relation of their final assembly. The matrix is then charged with a plastic or molten mass of non-magnetic material and the material allowed to set. If desired, the entire space remaining between the confronting inner faces of the pole shoes may be filled with the body material 7, but at least, the magnet bars should be completely encased, as indicated at 7a, and the material should preferably extend over the end surfaces of the pole shoes as indicated at 7b in the manner of end plates. In this manner all parts of the rotor, including the shaft, magnet bars and pole shoes are rigidly bonded together in the formation of an integral rotor structure. Any tendency of the body material 7 to shrink while setting will result in the pole shoes being drawn inwardly toward each other, and into pressure engagement with the ends of the magnet bars. Further, since the body material is moulded about the end surfaces of the pole shoes, natural shrinkage of the body material during freezing causes the pole shoe lamina to be compressed and held tightly together.

The magnet bars are arranged in polar correspondence, one pole shoe constituting the north pole, and the opposite shoe the south pole of the assembly. It is preferable to magnetize the bars simultaneously and after the same have been assembled and cast in place, since this eliminates the necessity of particularizing to assure that the bars are arranged with their poles in correspondence.

It will be noted that the magnet bars are completely encased, their end portions by the pole shoes and their intermediate portions by the body material 7. This is desirable because of the physical properties of the metal from which the magnet bars are fabricated. Alnico steel, previously referred to as a desirable magnetic material, is relatively brittle and frangible. It has been found, however, that a fracture does not materially impair the value of an Alnico magnet if the parts thereof are maintained in contact, and such necessarily results where, as in the present construction, the bars are completely encased by the body material.

Fig. 11 illustrates a pole shoe of modified construction and differs from the pole shoe of Fig. 6 in that it is adapted for use with magnet bars of rectangular cross-section, as shown in Fig. 12, and requires no machining after assembly to form the pockets for receiving the ends of the magnet bars. The pole shoe of Fig. 11 is formed of an intermediate group and two end groups of stampings 3, previously described and illustrated in Fig. 6, and intervening groups of stampings 16 of the character illustrated in Fig. 9. Each intervening group is of composite width equal to the width of the rectangularly sectional bar 15, and the stampings constituting the intermediate groups have recesses 21 which combine to produce the rectangular pockets in the inner face of the pole shoe. With the exception of the additional recesses 21, stampings 16 are identical to stampings 3, having an arcuate outer edge 17, straight inner edge 20, centralized dovetail recess 18 and rivet apertures 19 which correspond respectively to the characterizations 4, 5, 6 and 9 of the stampings 3. In the modified construction it will be noted that the magnet bars, like the arrangement thereof in the structure of Fig. 5, are spaced from each other and likewise spaced inwardly from the sides and ends of the rotor body. In the finished product no portions of the magnet bars are exposed.

It is to be understood that my invention is not limited to the presently described embodiment as substantial alterations or modifications may be made thereto without departing from the spirit and full intended scope of the invention as defined by the appended claims.

I claim:

1. In a rotor for a magneto of rotating field type, a shaft, a plurality of bar magnets disposed on opposite sides of and arranged transversely to the shaft, a pair of pole shoes of laminated construction defining at least a portion of the periphery of the rotor, the laminations of which each such shoe is formed including a number thereof edgewise abutting the adjacent end faces of the bar magnets, a plurality of additional laminations having corresponding portions of greater width than those engaging the end faces of the bar magnets, and additional laminations in the shoe arranged laterally beyond each of the bar magnets in a direction axially of the rotor, the laminations of relatively greater and lesser width being relatively so assembled in the shoe as to provide sockets for the reception of and fully embracing the ends of the bar magnets, and means for securing the shoes and magnets in assembled relation to the shaft.

2. In a rotor for a magneto of rotating field type, a shaft, a plurality of bar magnets disposed on opposite sides of and arranged transversely to the shaft, a pair of pole shoes of laminated construction defining at least a portion of the periphery of the rotor, the laminations of which each such shoe is formed including a number thereof edgewise abutting the adjacent end faces of the bar magnets, a plurality of additional laminations having corresponding portions of greater width than those engaging the end faces of the bar magnets, and additional laminations in the shoe arranged laterally beyond each of the bar magnets in a direction axially of the rotor, the laminations of relatively greater and lesser width being relatively so assembled in the shoe as to provide sockets for the reception of and fully embracing the ends of the bar magnets, and means for securing the shoes and magnets in assembled relation to the shaft, said means including a body of cast, non-magnetic material having portions thereof encasing the bar magnets between the ends thereof.

3. In a rotor for a magneto of rotating field type, a shaft, a plurality of bar magnets disposed on opposite sides of and arranged transversely to the shaft, a pair of pole shoes of laminated construction defining at least a portion of the periphery of the rotor, the laminations of which each such shoe is formed including a number thereof edgewise abutting the adjacent end faces of the bar magnets, a plurality of additional laminations having corresponding portions of greater width than those engaging the end faces of the bar magnets, and additional laminations in the shoe arranged laterally beyond each of the bar magnets in a direction axially of the rotor, the laminations of relatively greater and lesser width being relatively so assembled in the shoe as to provide sockets for the reception of and fully embracing the ends of the bar magnets, and means for securing the shoes and magnets in assembled relation to the shaft, said means comprising a body of cast, non-magnetic metal integrally uniting the pole shoes and bar magnets to the shaft and completely surrounding the portions of the bar magnets between the pole shoes.

CURT F. REIS.